United States Patent [19]

Yamasaki et al.

[11] Patent Number: 4,770,934

[45] Date of Patent: Sep. 13, 1988

[54] INK JET RECORDING MEDIUM

[75] Inventors: Takeshi Yamasaki, Funabashi; Masao Suginaga, Tokyo, both of Japan

[73] Assignee: Mitsubishi Paper Mills, Ltd., Tokyo, Japan

[21] Appl. No.: 948,174

[22] Filed: Dec. 31, 1986

[30] Foreign Application Priority Data

Jan. 6, 1986 [JP] Japan .................................. 61-1136

[51] Int. Cl.[4] ............................................... B32B 5/16

[52] U.S. Cl. ................................ 428/331; 346/135.1; 427/261; 427/361; 427/362; 427/364; 427/391; 428/195; 428/207; 428/211; 428/342; 428/537.5

[58] Field of Search ..................... 346/135.1; 427/261, 427/361, 362, 364, 391; 428/195, 207, 211, 537.5, 331, 342

[56] References Cited

U.S. PATENT DOCUMENTS 2,759,847 8/1956 Frost et al. ........................... 117/64

4,440,827 4/1984 Miyamoto et al. ................. 428/327

4,460,637 7/1984 Miyamoto et al. ................. 428/212

4,613,525 9/1986 Miyamoto et al. ................. 427/256

*Primary Examiner*—John E. Kittle

*Assistant Examiner*—P. R. Schwartz

*Attorney, Agent, or Firm*—Armstrong, Nikaido, Marmelstein & Kubovcik

[57] ABSTRACT

An ink jet recording medium having at least one ink receptive layer containing synthetic silica of fine particle form as a main pigment, having a recording surface dried by pressing said recording surface against a heated mirror surface, and having ink receptive layer having an absorption capacity of at least 10 $g/m^2$ is disclosed.

That is, the present invention provides an ink jet recording medium which has a gloss without requiring any post-treatment for imparting the gloss, has a high ink absorbability and gives a high color reproducibility and a high color density in printing with a water-base ink, particularly a recording medium for full color ink jet recording having a gloss.

5 Claims, 1 Drawing Sheet

LIGHT-RECEIVING ANGLE

LIGHT-RECEIVING ANGLE

INK JET RECORDING MEDIUM

DETAILED EXPLANATION OF THE INVENTION (A) Industrial Field of Utilization

The present invention relates to a recording medium for use in recording with an ink. More particularly, the present invention relates to an ink jet recording medium suitable for use in such multicolor recording as a water-base ink containing a water-soluble dye is converted into microdrops by an appropriate mechanism and the microdrops are allowed to be depositted to a recording medium to conduct recording.

Ink jet recording can conduct recording in high speed, low noise and multicolor, having high flexibility in recorded patterns and requiring neither development nor fixation. Hence, it is rapidly gaining acceptance in various applications, as a means for obtaining hard copies of Chinese characters, drawings, color images, etc. Further, images obtained by multicolor ink jet recording are comparable in quality to those by multicolor printing using a plate or to those by color photography and, when the number of required copies is small, are less expensive than those by color photography. Hence, ink jet recording is being applied even to the field of full color image recording.

(B) Prior Art

In ink jet recording, efforts have been made in recording apparatuses and ink compositions in order to enable the use, as a recording medium, of a wood-free paper or a coated paper used in ordinary printing and writing. However, with the performance improvement of ink jet recording apparatuses (e.g. higher speed recording, more precise recording, full color recording) or with the wider application of ink jet recording, higher requirements have been imposed also on the recording medium used in ink jet recording. Main requirements for the recording medium are as follows. The ink droplets which have depositted to the recording medium have a high color density and their color is bright and clear; the ink is absorbed quickly and accordingly, even when numbers of ink droplets depositted to one same spot, there occurs no ink flowing or bleeding; the ink droplets do not diffuse on the recording medium along the surface to an undesirable degree and their peripheries are smooth and not dim; and the resistance of the dye of the ink is not reduced and preferably is increased when the recorded image is exposed to an ultraviolet light, oxygen in the air or water. Various proposals have been made in order to satisfy the above requirements for the recording medium. For example, Japanese Patent Application Kokai (Laid-Open) No. 53012/1977 discloses an ink jet recording paper obtained by wetting a base paper of low sizing with a coating intended for surface treatment. Japanese Patent Application Kokai (Laid-Open) No. 49113/1978 discloses an ink jet recording paper obtained by impregnating a sheet containing an urea-formalin resin powder, with a water-soluble high molecular substance. With respect to coated papers, Japanese Patent Application Kokai (Laid-Open) No. 5830/1980 discloses an ink jet recording paper obtained by forming, on the surface of a substrate, a layer having an ink absorbability, by means of coating; Japanese Patent Application Kokai (Laid-Open) No. 1583/1980 discloses a recording medium having a layer containing, as a pigment, a non-colloidal silica powder; and Japanese Patent Application Kokai (Laid-Open) No. 1829/1980 discloses a coated paper having a structure of two layers different in ink absorption rate.

In general, an ink-receiving layer having an ink absorbability is required to have a number of spaces therein to enable the absorption and holding of ink therein. As a result, the ink-receiving layer having a number of such spaces has a number of interfaces with air; the surface of the layer inevitably has a high degree of microscopic unevenness, allows a light applied thereon to cause irregular reflection resulting in prevention of transmittance of the light through the layer, and accordingly is difficult to have a gloss and becomes opaque. Moreover, a light is difficult to reach the ink held in the spaces, which makes the recorded image look whitish and gives a reduced color reproducibility and a reduced color density. In order to solve these drawbacks and to obtain an image having a gloss, a high color reproducibility and a high color density, various proposals have been made. For example, there are the following proposals each employing a post-treatment. Japanese Patent Application Kokai (Laid-Open) No. 35538/1978 and Japanese Patent Application Kokai (Laid-Open) No. 35539/1978 disclose a process wherein a glazing liquid is sprayed to a recording medium after printing; Japanese Patent Application Kokai (Laid-Open) No. 50744/1978, Japanese Patent Application Kokai (Laid-Open) No. 196285/1979, Japanese Patent Application Kokai (Laid-Open) No. 201891/1979, Japanese Patent application Kokai (Laid-Open) No. 204591/1979, Japanese Patent Application Kokai (Laid-Open) No. 204592/1979 and Japanese Patent Application Kokai (Laid-Open) No. 222381/1979, etc. disclose a process wherein a recording paper containing a thermoplastic resin and its fine particles is subjected, after printing, to a post-treatment using a heat, a pressure and a plasticizer and/or an organic solvent; Japanese Patent Application Kokai (Laid-Open) No. 63264/1982 discloses a process wherein a transparent toner is allowed to adhere to a recording medium after printing and then the recording medium is subjected to a pressurization treatment; Japanese Patent Application Kokai (Laid-Open) No. 77154/1981 discloses a process wherein, after printing, the spaces are filled with a non-volatile colorless substance; Japanese Patent Application Kokai (Laid-Open) No. 190885/1984 discloses a process where in a recording medium is, after printing, impregnated with a photocurable resin and then the resin is cured; and Japanese Patent Application Kokai (Laid-Open) No. 150370/1980 discloses a process wherein a recording paper containing a synthetic pulp is, after printing, subjected to a heat treatment.

These post-treatments are capable of providing a recorded image with a gloss but requires an additicnal apparatus for post-treatment and a more complicated printing operation. Hence, such post-treatments have low practicability and make the total apparatus cost very high.

Hence, there is needed an ink jet recording medium which has a gloss without requiring any post-treatment for imparting the gloss and yet has a high ink absorbability.

For example, Japanese Patent Application Kokai (Laid-Open) No. 82085/1982 and Japanese Patent Application Kokai (Laid-Open) No. 135190/1982 disclose, as such a recording medium, one containing a plastic pigment and subjected to a heated calender treatment.

Ink jet recording medium using a plastic pigment can satisfy both of an ink absorbability and a gloss. In these recording medium, however, because there exists a number of spaces among the plastic pigment particles in order to achieve the ink absorbability, reduction in color reproducibility and in color density is inevitable on account of the high refractive index of the plastic pigment, whereby no clear image can be obtained.

PROBLEMS THAT THE INVENTION IS TO SOLVE

The present invention is intended to provide an ink jet recording medium which has a gloss without requiring any post-treatment for imparting the gloss, has a high ink absorbability and gives a high color reproducibility and a high color density in printing with a water-base ink, particularly a recording medium for full color ink jet recording with a gloss.

MEANS FOR SOLVING THE PROBLEMS

The present invention relates to an ink jet recording medium for forming a recorded image using a water-base ink, being composed of at least one ink receptive layer containing synthetic silica of fine particle form as a main pigment formed on a substrate having a recording surface dried by pressing a wet surface against a heated mirror surface and having ink receptive layer having an ink absorption capacity of at least 10 $g/m^2$. This ink jet recording medium is also useful as a recording medium having an ink absorbability used for other purposes, such as a heat transfer type, color image-recording paper or the like.

The substrate used in the ink jet recording medium of the present invention can be any as long as it has a gas permeability. As the substrate, there can be used, for example, an ordinary paper, a coated paper, etc. The ink-receiving layer formed on the substrate is composed mainly of (a) synthetic silica of fine particle form having a high ability for ink absorption and holding, and having high transparency, and (b) a binder.

The synthetic silica of fine particle form used in the ink-receiving layer, preferably has a specific surface area of at least 100 $m^2/g$ when measured in accordance with the BET method, in view of its ink absorbability.

The pigments other than synthetic silica of fine particle form, contained in the ink-receiving layer include, for example, inorganic or organic pigments such as calcium carbonate, kaolin, talc, calcium sulfate, barium sulfate, titanium dioxide, zinc oxide, zinc carbonate, aluminum silicate, aluminum hydroxide, aluminum oxide, calcium silicate, magnesium silicate, a plastic pigment, an urea resin pigment and the like. All these pigments, being non-transparent, deteriorate the clearness of printed image. Therefore, the content of the synthetic silica of fine particle form is preferably at least 80 parts by weight, more preferably at least 95 parts by weight per 100 parts by weight of total pigments.

The binders used in the ink receptive layer include, for example, starch derivatives such as oxidized starch, etherified starch, phosphorylated starch and the like; cellulose derivatives such as carboxymethyl cellulose, hydroxyethyl cellulose and the like; casein; gelatin; soybean protein; a polyvinyl alcohol and its derivatives; a maleic anhydride resin; latexes of conventional conjugated diene polymers such as a styrene-butadiene copolymer, a methyl methacrylate-butadiene copolymer and the like; latexes of acrylic polymers such as a polymer or copolymer of an acrylic acid ester or a methacrylic acid ester and the like; latexes of vinyl polymers such as an ethylene-vinyl acetate copolymer and the like; latexes of functional group-modified polymers obtained by modifying the above mentioned polymers with a monomer having a functional group such as a carboxyl group or the like; aqueous binders of thermosetting synthetic resins such as a melamine resin, an urea resin and the like; and binders of synthetic resins such as a polymethyl methacrylate, a polyurethane resin, an unsaturated polyester resin, a vinyl chloride-vinyl acetate copolymer, a polyvinyl butyral, an alkyd resin and the like. These binders are used singly or as a mixture or more. Of these binders, a polyvinyl alcohol and its derivatives are preferred from the standpoint of adhesivity; and casein, soybean protein and latexes are preferred from the standpoint of gloss.

The binder is used in an amount of 2 to 100 parts, preferably 20 to 90 parts per 100 parts of total pigments. However, the amount has no particular restriction as long as it can ensure sufficient adhesion of pigments to the substrate. The use of the binder in an amount exceeding 100 parts is not preferable because it reduces space structure or significantly makes the space small due to the film formation by the binder.

The recorded image formed with a water-base ink is preferred not to be washed away by water. For this purpose, a waterproofing agent such as a cationic resin, a cationic surfactant, cation-modified inorganic particles or the like can be added. The ink-receiving layer can further contain as necessary a pigment-dispersing agent, a thickening agent, a fluidity improver, a defoamant, a foam-suppressor, a releasing agent, a foaming agent, a penetrating agent, a coloring pigment, a coloring dye, a fluorescent dye, an ultraviolet absorber, an antioxidant, an antiseptic, an antifungal agent, etc.

The formation of an ink receptive layer (i.e. a recording surface) on a substrate conducted using a casting method wherein a plastic and wet layer formed on a substrate is pressed against the surface (mirror surface) of a heated drum, fried and then released.

As the casting method, there can be used any of the followings.

(1) A wet casting method wherein a wet layer just formed on a substrate is dried by directly pressing this layer against a heated mirror surface.

(2) A rewet casting method wherein a wet layer just formed on a substrate is once dried, then rewetted for plasticization and dried by pressing against a heated mirror surface.

The rewetting liquid of the rewet casting method in the casting method can contain, as necessary, not only a glazing agent and a solidifying agent but also a releasing agent, a penetrating agent, a coloring agent, an ultraviolet absorber, an antioxidant, an antiseptic, an antifungal agent, etc.

The recording surface formed by the casting method is preferred to have a 75° specular gloss of at least 15%. The recording surface is further preferred to have a half-hight-width of a reflected light distribution curve of 10° or below at an incident angle of 75°. Outside these ranges, the recording surface can not have a sufficient gloss.

The above half-height-width is, as shown in FIG. 1, a width of light-receiving angles for lights having reflection intensities of at least half of the maximum value of the reflected light distribution curve obtained using a goniophotometer. The half-height-width is smaller when the gloss is higher.

While the ink absorption capacity required for ink jet recording medium differs by the total amount of inks depositted, it is important that there occurs neither flooding nor flow of recorded image. In the present invention, the ink absorption capacity is at least 10 g/m$^2$ particularly when the ink jet recording medium is used for multicolor or full color ink jet recording wherein the large amount of inks is depositted.

The water-base ink referred to in the present invention is a recording liquid consisting of the following coloring agent, a liquid medium and other additives.

As the coloring agent, there are preferably used water-soluble dyes such as a direct dye, an acid dye, a reactive dye, a coloring matter for foodstuffs and the like.

The direct dye includes, for example, the followings.

C. I. Direct Black: 2, 4, 9, 11, 14, 17, 19, 22, 27, 32, 36, 38, 41, 48, 49, 51, 56, 62, 71, 74, 75, 77, 78, 80, 105, 106, 107, 108, 112, 113, 117, 132, 146, 154, 194

C. I. Direct Yellow: 1, 2, 4, 8, 11, 12, 24, 26, 27, 28, 33, 34, 39, 41, 42, 44, 48, 50, 51, 58, 72, 85, 86, 87, 88, 98, 100, 110

C. I. Direct Orange: 6, 8, 10, 26, 29, 39, 41, 49, 51, 102,

C. I. Direct Red: 1, 2, 4, 8, 9, 11, 13, 17, 20, 23, 24, 28, 31, 33, 37, 39, 44, 46, 47, 48, 51, 59, 62, 63, 73, 75, 77, 80, 81, 83, 84, 85, 90, 94, 99, 101, 108, 110, 145, 189, 197, 220, 224, 225, 226, 227, 230

C. I. Direct Violet: 1, 7, 9, 12, 35, 48, 51, 90, 94

C. I. Direct Blue: 1, 2, 6, 8, 15, 22, 25, 34, 69, 70, 71, 72, 75, 76, 78, 80, 81, 82, 83, 86, 90, 98, 106, 108, 110, 120, 123, 158, 163, 165, 192, 193, 194, 195, 196, 199, 200, 201, 202, 203, 207, 218, 236, 237, 239, 246, 258

C. I. Direct Green: 1, 6, 8, 28, 33, 37, 63, 64

C. I. Direct Brown: 1A, 2, 6, 25, 27, 44, 58, 95, 100, 101, 106, 112, 173, 194, 195, 209, 210, 211, The acid dye includes, for example, the followings C. I. Acid Black: 1, 2, 7, 16, 17, 24, 26, 28, 31, 41, 48, 52, 58, 60, 63, 94, 107, 109, 112, 118, 119, 121, 122, 131, 155, 156

C. I. Acid Yellow: 1, 3, 4, 7, 11, 12, 13, 14, 17, 18, 19, 23, 25, 29, 34, 36, 38, 40, 41, 42, 44, 49, 53, 55, 59, 61, 71, 72, 76, 78, 99, 111, 114, 116, 122, 135, 161, 172

C. I. Acid Orange: 7, 8, 10, 33, 56, 64

C. I. Acid Red: 1, 4, 6, 8, 13, 14, 15, 18 19, 21, 26, 27, 30, 32, 34, 35, 37, 40, 42, 51, 52, 54, 57, 80, 82, 83, 85, 87, 88, 89, 92, 94, 97, 106, 108, 110, 115, 119, 129, 131, 133, 134, 135, 154, 155, 172, 176, 180, 184, 186, 187, 243, 249, 254, 256, 260, 289, 317, 318

C. I. Acid Violet: 7, 11, 15, 34, 35, 41, 43, 49, 75

C. I. Acid Blue: 1, 7, 9, 22, 23, 25, 27, 29, 40, 41, 43, 45, 49, 51, 53, 55, 56, 59, 62, 78, 80, 81, 83, 90, 92, 93, 102, 104, 111, 113, 117, 120, 124, 126, 145, 167, 171, 175, 183, 229, 234, 236

C. I. Acid Green: 3, 9, 12, 16, 19, 20, 25, 27,

C. I. Acid Brown: 4, 14

The basic dye includes, for example, the followings.

C. I. Basic Black: 2, 8

C. I. Basic Yellow: 1, 2, 11, 12, 14, 21, 32, 36

C. I. Basic Red: 1, 2, 9, 12, 13, 37

C. I Basic Violet: 1, 3, 7, 10, 14

C. I Basic Blue: 1, 3, 5, 7, 9, 24, 25, 26, 28,

C. I. Basic Green: 1, 4

C. I. Basic Brown: 1,12

The reactive dye includes, for example, the followings.

C. I. Reactive Black:, 1, 3, 5, 6, 8, 12, 14

C. I. Reactive Yellow: 1, 2, 3, 13, 14, 15, 17

C. I. Reactive Orange: 2, 5, 7, 16, 20, 24

C. I. Reactive Red:, 6, 7, 11, 12, 15, 17, 21, 23, 24, 35, 36, 42, 63, 66

C. I. Reactive Violet: 2, 4, 5, 8, 9

C. I. Reactive Blue: 2, 5, 7, 12, 13, 14, 15, 17, 18, 19, 20, 21, 25, 27, 28, 37, 38, 40, 41, 71

C. I. Reactive Green: 5, 7

C. I. Reactive Brown: 1, 7, 16

The coloring matter for foodstuffs include, for example, the followings.

C. I. Food Black: 2

C. I. Food Yellow: 3, 4, 5

C. I. Food Red: 2, 3, 7, 9, 14, 52, 87, 92 94, 102, 104, 105, 106

C. I. Food Violet: 2

C. I. Food Blue: 1, 2

C. I. Food Green: 2, 3

As the liquid medium, there can be mentioned water as well as water-soluble organic solvents such as an alkyl alcohol of 1 to 4 carbon atoms (e.g. methyl alcohol, ethyl alcohol, n-propyl alcohol, isopropyl alcohol, n-butyl alcohol, sec-butyl alcohol, tert-butyl alcohol, isobutyl alcohol), an amide (e.g. dimethylformamide, dimethylacetamide), a ketone or a ketone alcohol (e.g. acetone, diacetone alcohol), an ether (e.g. tetrahydrofuran, dioxane), a polyalkylene glycol (e.g. a polyethylene glycol, a polypropylene glycol), an alkylene glycol having 2 to 6 alkylenes (e.g. ethylene glycol, propylene glycol, butylene glycol, triethylene glycol, 1,2,6-hexanetriol, thiodiglycol, hexylene glycol, diethylene glycol), glycerin, a lower alkyl ether of a polyalcohol (e.g. ethylene glycol methyl ether, diethylene glycol methyl or ethyl ether, triethylene glycol monomethyl ether) and the like.

Preferable of these water-soluble organic solvents are polyalcohols such as diethylene glycol and the like, as well as lower alkyl ethers of polyalcohols such as triethylene glycol monomethyl ether, triethylene glycol monoethyl ether and the like.

As the other additives, there can be mentioned, for example, a pH-controlling agent, a metal-hindering agent, an antimold agent, a viscosity-controlling agent, a surface tension-controlling agent, a wetting agent, a surfactant and a rust preventive.

Performances of the ink jet recording medium of the present invention were examined in accordance with the following methods.

Ink absorption capacity was measured by cortacting a polyethylene glycol (PEG No. 400) - water (50-50) solution with a predetermined area of the ink receptive layer of an ink jet recording medium for 10 seconds at 20° C., removing an excessive amount of the solution with a blotting paper, measuring the weight of the solution absorbed by the ink receptive layer and expressing the weight in terms of g/m$^2$.

Ink absorption rate was rated by conducting solid printing in a red color (magenta+yellow) onto an ink jet recording medium using an ink jet printer (I0-700, manufactured by Sharp Co.), immediately thereafter (about 1 second) contacting the recording medium with a paper-pressing roll and examining the extent of stain which appears on the recording medium as a result of the contact.

75° specular gloss was measured in accordance with JIS P 8142 using a gloss photometer (VGS-1001, manufactured by Nihon Denshoku Kogyosha).

Half-width of reflected light distribution curve at an incident angle of 75°±15° was obtained by preparing a reflected light distribution curve over a reflected light angle range of 75°±15° using a goniophotometer (GP-1R, manufactured by Murakami Shikisai Gijutsu Kenkyujo) under conditions of a C light source, an incident angle of 75°, a diaphragm diameter (for incident light) of 9.5 mm and a diaphragm diameter (for receiving light) of 3.0 mm (an aperture angle of light-receiving apparatus: 0.6°) and examining, from the reflected light distribution curve, a range of light-receiving angles for lights giving reflection intensities of at least half of the maximum reflection intensity.

Gloss was visually rated for an ink jet recording medium before printing.

Clearness of printed image was visually rated for an ink jet recording medium after having been subjected to printing using an ink jet printer (I0-700 manufactured by Sharp Co.).

PRINCIPLE OF THE PRESENT INK JET RECORDING MEDIUM

The ink receptive layer of the present ink jet recording medium, which uses synthetic silica of fine particle form as a main pigment and has a recording surface formed by pressing a wet layer formed on the substrate of the recording medium against a heated mirror surface and drying the wet layer, has a high gloss and yet a high ink absorbability. The reason is not clear.

However, the reason for high gloss and high ink absorbability is presumed to be that the use of silica of high absorbability as a main pigment makes large spaces among pigment particles present in the ink-receiving layer and these spaces are preserved during the period of drying by pressing against a heated mirror surface. This preservation of spaces among pigment particle is presumed to be due to the passing of vapors through the spaces while the resin components present on the surface of the ink-receiving layer as a binder, etc. are heat-treated by the mirror surface.

EXAMPLES

The present invention will be explained specifically below by way of EXAMPLES. However, the present invention is in no way restricted to these EXAMPLES.

In the EXAMPLES, parts and % refer to parts by weight and % by weight, respectively.

Example 1

To a pulp slurry consisting of 80 parts of hardwood bleached kraft pulp having a freeness of 370 ml (csf), and 20 parts of softwood bleached kraft pulp having a freeness of 400 ml (csf), was added 10 parts of talc, 0.4 part of a saponified rosin and 1.8 parts of aluminum sulfate. The resulting mixture was made into a paper sheet, 65 g/m$^2$ in basis weight, on Fourdrinier paper machine. A sizing solution consisting of an oxidized starch was applied on the paper sheet at an application rate of 2.5 g/m$^2$ on dry basis by means of a size press equipment installed at paper machine. The resulting paper was used as a substrate.

On this substrate, a coating composition of 20% solid content consisting of 100 parts of synthetic silica of fine particle form having a specific surface area of 300 m$^2$/g when measured in accordance with the BET method (Silloid 74, manufactured by Fuji Davison Co.), 30 parts of a polyvinyl alcohol (PVA 117, manufactured by KURARAY CO., LTD.) and 20 parts of colloidal silica (Snowtex-O, manufactured by Nissan Chemical Industries, JbNtd.) was coated by means of air knife coater at coating weight of 15 g/m$^2$ on dry basis. Then, the coated layer was dried to obtain a coated paper. Water was sprayed uniformly on the surface of the coated paper to wet the dried coated layer. While the layer was in a wet state, the layer was pressed against a casting drum having a heated mirror surface to be dried, whereby a recording medium of Example 1 was obtained. The results of evaluation of this recording medium are shown in Table 1.

COMPARATIVE EXAMPLE 1

The procedure of Example 1 was repeated except that the dried coated paper was subjected to super calendering in place of being wet and pressed against a heated casting drum to be dried, whereby a recording medium of Comparative Example 1 was obtained. The results of evaluation of this recording medium are shown in Table 1.

Example 2

The same coated paper as in Example 1 was further coated with a 5% casein solution dissolved with ammonia at the coated weight of 1.0 g/m$^2$ on dry basis. While the coated solution is in a wet state, the coated side of the paper was pressed against a heated casting drum to be dried, whereby a recording medium of Example 2 was obtained. The results of evaluation of this recording medium are shown in Table 1.

Example 3

A coated paper was prepared and dried in the same procedure as in Example 1 except that the amount of coated weight was 25 g/m$^2$ on dry basis. Thereon was further coated a coating composition of 12% solid content consisting of 95 parts of synthetic silica of fine particle form having a specific surface area of 265 m$^2$/g (Fine Sil X-37, manufactured by Tokuyama Soda Co., Ltd.), 5 parts of light calcium carbonate (Tankaru PC, manufactured by Shiraishi Kogyo), 60 parts of a polyvinyl alcohol (PVA 117, manufactured by KURARAY CO., LTD.), 7 parts of a cationic resin (Polyfix 601, manufactured by Showa High Polymer Co., Ltd.) and small amounts of a pH-controlling agent and a defoamant at coated weight of 4 g/m$^2$ at dry basis. While the coated layer was in a wet state, the coated side of the paper was pressed against a heated casting drum to be dried, whereby a recording medium of Example 3 was obtained. The results of evaluation of this recording medium are shown in Table 1.

Example 4

To a pulp slurry consisting of 80 parts of hardwood bleached kraft pulp having a freeness of 380 ml (csf), and 20 parts of softwood bleached kraft pulp having a freeness of 410 ml (csf), were added 14 parts of precipitated calcium carbonate (Tankaru PC, manufactured by Shiraishi Kogyo), 1 part of cationic resin as an retention agent and dry strength agent. The resulting mixture was made into a paper sheet, 70 g/m$^2$ in basis weight, on Fourdrinier paper machine. A sizing solution containing a 2% polyvinyl alcohol was applied on the paper sheet by means of a size press equipment installed at paper machine. The resulting paper was dried and taken up through a machine calender, whereby a substrate was obtained.

On this substrate was coated a coating composition of 15% solid content consisting of 100 parts of synthetic silica (Silloid 74) and 60 parts of a polyvinyl alcohol (a $\frac{1}{4}$ blend of PVA 117 and PVA 105) using an air knife coater at the coated weight of 10 $g/m^2$ on dry basis. Then the coated layer was dried to obtain a coated paper. Water was sprayed on the coated side of the paper. While the coated side was in a wet state, the side was pressed against a heated casting drum to be dried, whereby a recording medium of Example 4 was obtained. The results of evaluation of this recording medium are shown in Table 1.

COMPARATIVE EXAMPLE 2

The same coated paper as in Example 4 was subjected to the same super calendering as in Comparative Example 1, whereby a recording medium of Comparative Example 2 was obtained. The results of evaluation of this recording medium are shown in Table 1.

against a heated casting drum and dried, whereby a recording medium of Example 6 was obtained. The results of evaluation of this recording medium are shown in Table 1.

COMPARATIVE EXAMPLES 3 to 5

A commercially available coated paper (Mitsubishi Kote, manufactured by Mitsubishi Paper Mills Ltd.), a commercially available ink jet recording paper (IJ-Matt Coat NM, manufactured by Mitsubishi Paper Mills Ltd.) and a commercially available cast-coated paper (Luxe Kote-P, manufactured by Mitsubishi Paper Mills Ltd.) were used as recording media of Comparative Examples 3, 4 and 5, respectively. The results of evaluation of these recording medium are shown in Table 1.

TABLE 1

| Recording medium | Evaluation item: 75° specular gloss:$G_S$(75°) (%) | Half-height-width of reflected light distribution curve angle (°) | Ink absorption capacity ($g/m^2$) | Ink absorption rate | Gloss | Clearness of printing*1 |
|---|---|---|---|---|---|---|
| Example 1 | 19 | 9 | 18.6 | ○ | ○ | ◎ |
| Comparative Example 1 | 9 | 15 | 13.2 | Δ | X | ○ |
| Example 2 | 33 | 4 | 16.0 | ○ | ○ | ○ |
| Comparative Example 2 | 13 | 14 | 14.0 | ○ | Δ | Δ |
| Example 3 | 21 | 7 | 27.4 | ○ | ○ | ◎ |
| Example 4 | 36 | 5 | 15.1 | ○ | ○ | ◎ |
| Example 5 | 53 | 3 | 12.5 | ○ | ○ | ◎ |
| Example 6 | 23 | 6 | 10.2 | ○ | ○ | ○ |
| Comparative Example 3 | 45 | 6 | 4.5 | X | ○ | — |
| Comparative Example 4 | 2 | 30< | 25.1 | ○ | X | ○ |
| Comparative Example 5 | 81 | 3 | 6.2 | X | ◎ | — |

Note:
◎ very good, ○ good,
Δ slightly poor, X Poor
*1Clearness of printing was visually examined.

Example 5

A coated paper was obtained in the same procedure as in Example 4. On its coated side was further coated a solution containing 5% of casein dissolved with ammonium nitrat and 5% of a styrene-butadiene (40/60) polymer latex at the coated weight of 1.5 $g/m^2$ on dry basis. While the coated solution was in a wet state, the coated side of the paper was pressed against a heated casting drum to be dried, whereby a recording medium of Example 5 was obtained. The results of evaluation of this recording medium are shown in Table 1.

Example 6

On the same substrate as in Example 1 was coated a coating composition of 20% solid content consisting of 85 parts of synthetic silica of fine particle form having a specific surface area of 130 $m^2/g$ when measured in accordance with the BET method (Nipsil E 220 A, manufactured by Nihon Silica), 15 parts of synthetic hydrotalcite (Kyowaad 500, manufactured by Kyowa Kagaku Co., Ltd.) and 15 parts of colloidal silica (Snowtex-O) using an air knife coater at the coated weight of 10 $g/m^2$ on dry basis. Then, the coated layer was dried to obtain a coated paper. On the coated side of the paper was further coated a 3% casein solution dissolved with ammonia at the coated weight of 0.6 $g/m^2$ on dry basis. While the coated solution was in a wet state, the coated side of the paper was pressed

EFFECT OF THE INVENTION

As is obvious from Table 1, the recording medium of the present invention has a very high ink absorbability required for ink jet recording medium and yet a high gloss, and consequently gives a clear printed image. Therefore, said recording medium is highly suited for ink jet recording having a gloss, particularly for full color ink jet recording having a gloss.

Figure 1:
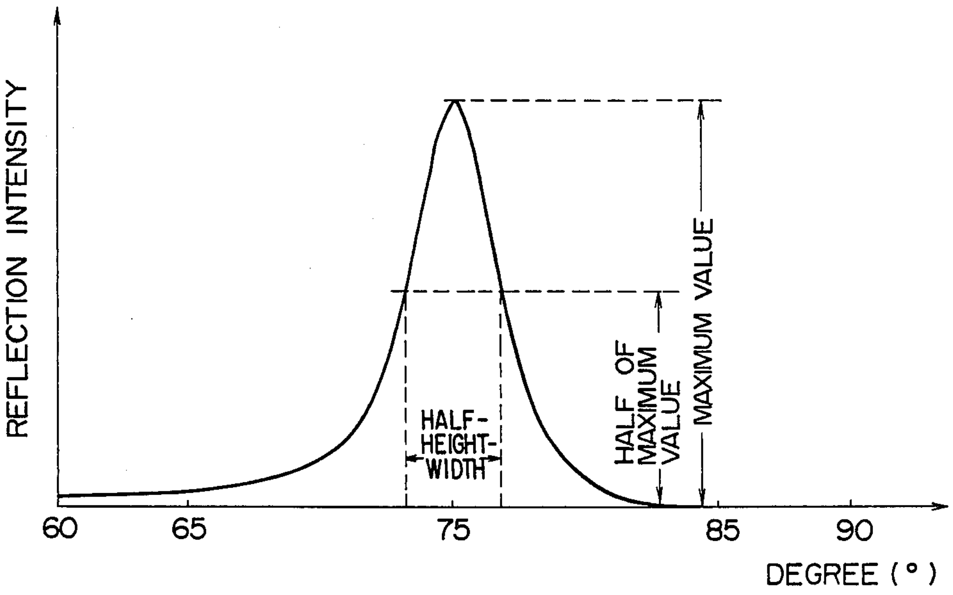
FIG. 1 shows a half-height-width of a reflected light distribution curve at an incident angle of 75°.

We claim:

1. An ink jet recording medium for forming a recorded image using a water base ink comprising a substrate, and formed thereon at least one ink receptive layer containing synthetic silica of fine powder form as a main pigment, a recording surface of said ink receptive layer having been dried by pressing a wet surface thereof with a heated mirror surface, and said ink receiptive layer having an ink absorbtion capacity of at least 10 $g/m^2$.

2. An ink jet recording medium according to claim 1, wherein the recording surface has a 75° specular gloss of at least 15%.

3. An ink jet recording medium according to any one of claims 1 and 2, wherein th recording surface has a half-width of a reflected light distribution curve of 10° or below at an incident angle of 75°.

4. An ink jet recording medium according to any one of claims 1 and 2 wherein the synthetic silica of fine particle form has a specific surface area of at least 100

$m^2/g$ when measured in accordance with the BET method.

5. An ink jet recording medium according to any one of claims 1 and 2 wherein the synthetic silica of fine particle form as a main pigment is added in an amount of at least 80 parts by weight per 100 parts by weight of total pigments.

* * * * *